United States Patent
Hancock et al.

(10) Patent No.: US 10,406,482 B2
(45) Date of Patent: Sep. 10, 2019

(54) OSMOTIC SEPARATION SYSTEMS AND METHODS

(71) Applicant: OASYS WATER LLC, Dover, DE (US)

(72) Inventors: Nathan T. Hancock, Boston, MA (US); Christopher Drover, Watertown, MA (US); Marek S. Nowosielski-Slepowron, Newton, MA (US); Garrett Akie, Jamaica Plain, MA (US)

(73) Assignee: OASYS WATER LLC, Dover, DE (US)

( * ) Notice: Subject to any disclaimer, the term of this patent is extended or adjusted under 35 U.S.C. 154(b) by 235 days.

(21) Appl. No.: 15/301,031

(22) PCT Filed: Mar. 31, 2015

(86) PCT No.: PCT/US2015/023542
§ 371 (c)(1),
(2) Date: Sep. 30, 2016

(87) PCT Pub. No.: WO2015/157031
PCT Pub. Date: Oct. 15, 2015

(65) Prior Publication Data
US 2017/0028348 A1 Feb. 2, 2017

Related U.S. Application Data

(60) Provisional application No. 62/069,627, filed on Oct. 28, 2014, provisional application No. 61/976,714, filed on Apr. 8, 2014.

(51) Int. Cl.
*C02F 1/00* (2006.01)
*C02F 1/38* (2006.01)
(Continued)

(52) U.S. Cl.
CPC ......... *B01D 61/005* (2013.01); *B01D 61/002* (2013.01); *B01D 61/58* (2013.01);
(Continued)

(58) Field of Classification Search
CPC .... B01D 61/005; B01D 61/58; B01D 63/082; B01D 61/002; B01D 61/364;
(Continued)

(56) References Cited

U.S. PATENT DOCUMENTS

| | | |
|---|---|---|
| 3,951,809 A | 4/1976 | Kollmar |
| 5,435,835 A | 7/1995 | Lynn et al. |

(Continued)

FOREIGN PATENT DOCUMENTS

| | | |
|---|---|---|
| EP | 0686605 A1 | 12/1995 |
| WO | 2008067246 A2 | 6/2008 |

(Continued)

*Primary Examiner* — David C Mellon
(74) *Attorney, Agent, or Firm* — Leason Ellis LLP

(57) ABSTRACT

The invention generally relates to osmotically driven membrane systems and processes and more particularly to systems and processes for handling feed streams without pretreatment and increased brine concentration for zero liquid discharge, including forward osmosis separation (FO), direct osmotic concentration (DOC), pressure-assisted forward osmosis (PAFO), and pressure retarded osmosis (PRO). The system includes: a plurality of forward osmosis units, each having a semi-permeable membrane assembly and a tank; and a separation system in fluid communication with the plurality of forward osmosis units and configured to separate the dilute draw solution into the concentrated draw solution and a solvent system.

10 Claims, 4 Drawing Sheets

(51) Int. Cl.
*C02F 1/44* (2006.01)
*B01D 61/00* (2006.01)
*B01D 61/02* (2006.01)
*B01D 61/14* (2006.01)
*B01D 61/36* (2006.01)
*B01D 61/58* (2006.01)
*B01D 63/08* (2006.01)
*C02F 103/08* (2006.01)

(52) U.S. Cl.
CPC ............ *B01D 63/082* (2013.01); *C02F 1/004* (2013.01); *C02F 1/385* (2013.01); *C02F 1/445* (2013.01); *B01D 61/027* (2013.01); *B01D 61/145* (2013.01); *B01D 61/364* (2013.01); *B01D 2311/04* (2013.01); *B01D 2311/08* (2013.01); *B01D 2311/12* (2013.01); *B01D 2311/25* (2013.01); *B01D 2313/083* (2013.01); *B01D 2315/06* (2013.01); *B01D 2317/022* (2013.01); *B01D 2317/04* (2013.01); *C02F 2103/08* (2013.01); *C02F 2301/046* (2013.01)

(58) Field of Classification Search
CPC ................ B01D 61/145; B01D 61/027; B01D 2311/25; B01D 2311/12; B01D 2311/08; B01D 2311/04; B01D 2317/04; B01D 2317/022; B01D 2315/06; B01D 2313/083; C02F 1/445; C02F 1/385; C02F 1/004; C02F 2103/08; C02F 2301/046
See application file for complete search history.

(56) References Cited

U.S. PATENT DOCUMENTS

| | | |
|---|---|---|
| 8,523,965 B2 | 9/2013 | Jones et al. |
| 2005/0016922 A1 | 1/2005 | Enzweiler et al. |
| 2010/0224476 A1 | 9/2010 | Cath et al. |
| 2011/0162540 A1 | 7/2011 | Klass, Sr. et al. |
| 2012/0067819 A1 | 3/2012 | McGinnis |
| 2012/0118827 A1 | 5/2012 | Chang et al. |
| 2012/0211421 A1 | 8/2012 | Self et al. |
| 2012/0267306 A1 | 10/2012 | McGinnis et al. |
| 2012/0267307 A1 | 10/2012 | McGinnis |
| 2012/0273417 A1 | 11/2012 | McGinnis et al. |
| 2013/0075335 A1 | 3/2013 | Prakash et al. |
| 2013/0264260 A1 | 10/2013 | Heinzl |
| 2014/0001122 A1 | 1/2014 | Schultz et al. |
| 2018/0354831 A1* | 12/2018 | Herron .................. C02F 1/445 |

FOREIGN PATENT DOCUMENTS

| | | |
|---|---|---|
| WO | 2010067063 A1 | 6/2010 |
| WO | 2012102677 A1 | 8/2012 |

* cited by examiner

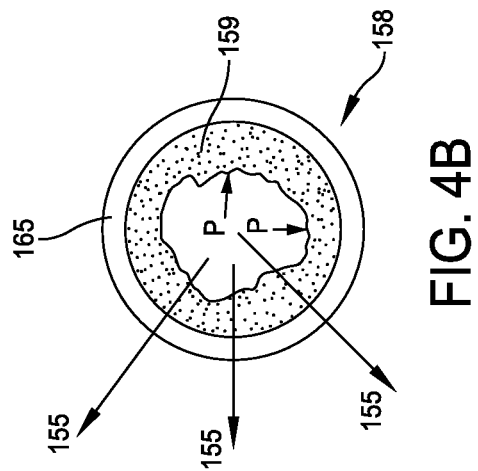
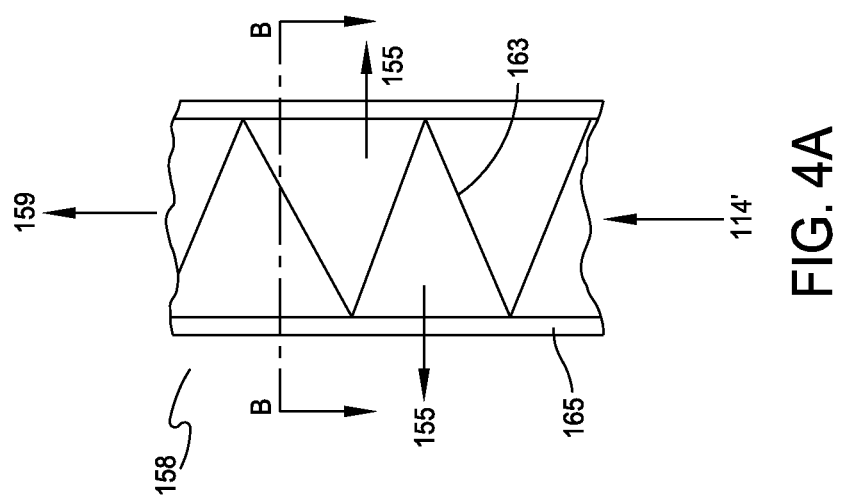

OSMOTIC SEPARATION SYSTEMS AND METHODS

CROSS-REFERENCE TO RELATED APPLICATIONS

This application is a U.S. national phase application, and claims the benefit of priority under 35 U.S.C. § 371, of PCT/US2015/023542, titled OSMOTIC SEPARATION SYSTEMS AND METHODS and filed on Mar. 31, 2015, which in turn claims priority to and the benefit of U.S. Provisional Patent Application Nos. 61/976,714, filed Apr. 8, 2014, and 62/069,627, filed Oct. 28, 2014; the entire disclosures of which are hereby incorporated by reference herein in their entireties.

FIELD OF THE TECHNOLOGY

One or more aspects relate generally to osmotic separation. More particularly, one or more aspects involve the use of osmotically driven membrane processes, such as forward osmosis, to separate solutes from aqueous solutions.

BACKGROUND

Forward osmosis has been used for desalination. In general, a forward osmosis desalination process involves a container having two chambers separated by a semi-permeable membrane. One chamber contains seawater. The other chamber contains a concentrated solution that generates a concentration gradient between the seawater and the concentrated solution. This gradient draws water from the seawater across the membrane, which selectively permits water to pass, but not salts, into the concentrated solution. Gradually, the water entering the concentrated solution dilutes the solution. The solutes are then removed from the dilute solution to generate potable water.

There are a variety of issues that can arise with respect to the feed solutions supplied to the forward osmosis process. For example, the feed solution can have a sufficiently low salinity that the concentrated draw solution on the opposite side of the membrane becomes highly diluted by the process, thereby complicating the recovery/regeneration of the draw solution. The condition of the feed solution may also require the use of certain pretreatment processes to make it usable in the forward osmosis process. Most pretreatment processes make the overall process more costly by, for example, requiring the use of additional energy or chemicals (e.g., lime softening) or further steps (e.g., regeneration of an ion exchange resin). Additionally, there can be disposal issues with the concentrated feed solution after forward osmosis processing. For example, highly concentrated brine raises environmental disposal issues, e.g., discharging concentrated brine into a body of water negatively impacts the local ecosystem. While there are some solutions for these problems, they tend to be expensive and/or add undue complexity to the basic forward osmosis process.

SUMMARY

Aspects of the invention relate generally to osmotically driven membrane systems and methods, including forward osmosis separation (FO), direct osmotic concentration (DOC), pressure-assisted forward osmosis (PAFO), and pressure retarded osmosis (PRO).

In one aspect, the invention relates to a system (and its corresponding method steps) for the osmotic extraction of a solvent from a first solution. The system includes a plurality of forward osmosis units, each having a first chamber having an inlet fluidly coupled to a source of the first solution, a second chamber having an inlet fluidly coupled to a source of a concentrated draw solution, and a semi-permeable membrane system separating the first chamber from the second chamber and configured for osmotically separating the solvent from the first solution, thereby forming a second solution in the first chamber and a dilute draw solution in the second chamber. The system also includes a separation system in fluid communication with the plurality of forward osmosis units and configured to separate the dilute draw solution into the concentrated draw solution and a solvent stream.

In various embodiments of the foregoing aspects, the concentrated draw solution includes ammonia and carbon dioxide in a desired molar ratio of greater than one to one. However, other draw solutions are contemplated and considered within the scope of the invention, including, for example, NaCl or any of the various alternative draw solutions disclosed in PCT Patent Publication No. WO2014/078415 (the '415 publication), the disclosure of which is hereby incorporated by reference herein in its entirety. In addition, other systems and methods for separating and recovering draw solutes and the solvent, such as those disclosed in the '415 publication, are contemplated and considered within the scope of the invention. Furthermore, various pretreatment and post-treatment systems can be incorporated in the forgoing aspects of the invention. The pretreatment systems can include at least one of a heat source for preheating the first solution, means for adjusting the pH of the first solution or the draw solution, means for disinfection (e.g., chemical or UV), separation and clarification, a filter or other means for filtering the first solution (e.g., carbon or sand filtration or reverse osmosis), means for polymer addition, ion exchange, or means for softening (e.g., lime softening) the first solution. The post-treatment systems can include at least one of a reverse osmosis system, an ion exchange system, a second forward osmosis system, a distillation system, a pervaporator, a mechanical vapor recompression system, a heat exchange system, or a filtration system (e.g., nano-, micro-, or ultrafiltration). In additional embodiments, the system can also include a recycling system including an absorber configured to facilitate reintroduction of the draw solutes to the second chamber to maintain the desired molar ratio of the draw solution.

In another aspect, the invention relates to a system for osmotic extraction of a solvent from a first solution. The system includes a plurality of forward osmosis units, where each unit includes a semi-permeable membrane assembly having a framework and a plurality of membranes coupled thereto and having first sides and second sides, where the first sides define a first plurality of channels for receiving the first solution and the second sides define a second plurality of channels for receiving a concentrated draw solution, and a tank configured for receiving the semi-permeable membrane assembly and the first solution, wherein the semi-permeable membrane assembly is at least partially submerged within the tank. The first solution includes dissolved and/or suspended solids therein and the membranes are configured for osmotically separating the solvent from the first solution, thereby forming a more concentrated first solution in the first plurality of channels and a dilute draw solution in the second plurality of channels. The system further includes a separation system in fluid communication with the plurality of forward osmosis units and configured for receiving the dilute draw solution from the forward osmosis units, a plurality of recirculation systems, each in fluid communication with a corresponding forward osmosis unit and configured for recirculating the more concentrated first solution through each tank, and a plurality of hydrocyclone circuits, each in fluid communication with a corresponding forward osmosis unit and/or recirculation system and configured to control a concentration of solids within the first solution within each tank. The separation system includes means for separating the dilute draw solution into the concentrated draw solution and a solvent stream. In some embodiments, the overall system includes a separation system for each forward osmosis unit. In various embodiments, the recirculation system recirculates the more concentrated first solution continuously. In addition, the recirculation system can be used to introduce the first solution to one or more of the forward osmosis units. The hydrocyclone circuit and/or the recirculation system can also be used to forward at least a portion of the first solution to a subsequent forward osmosis unit.

In various embodiments of the foregoing aspect, the first solution can include about 15,000 ppm total dissolved solids (TDS) therein. In some cases, the range of TDS in the first solution is about 5,000 ppm to about 40,000 ppm. The system can also include means for introducing an additive (e.g., seeds) to the first solution either directly or via the recirculation system. The introduction means can include a valve and port arrangement for directly introducing the additive to a fluid conveying line or one of the units. Additionally, the means can include a storage and/or mixing tank along with a metering device or the like for storing and/or delivering the additive to the system. In one embodiment, the additive is a seed material, such as calcium sulfate, and/or a dispersant to control the behavior of the suspended solids. In one or more embodiments, the framework includes a plurality of plates, each plate having first and second sides configured for receiving the membranes, which are coupled thereto (e.g., via adhesive, welding, or mechanical fasteners) and at least partially defining the first and second pluralities of channels, at least one endplate disposed at one end of the plurality of plates and membranes and a manifold assembly disposed at an opposite end of the plurality of plates and membranes, and means for securing the plurality of plates (e.g., tie rods), the at least one end plate, and the manifold assembly in a stacked configuration. In some embodiments, the framework is or includes a housing.

In additional embodiments, the system includes a clearwell stage in fluid communication with the plurality of forward osmosis units. The clearwell stage includes a receptacle configured for receiving the more concentrated first solution. The plurality of forward osmosis units can be arranged in series and the clearwell stage can be disposed proximate to and in fluid communication with a last forward osmosis unit in the series. Furthermore, each hydrocyclone circuit can include a hydrocyclone sized and configured to forward an overflow of the first solution to a subsequent forward osmosis unit in the series of forward osmosis units. The final hydrocyclone circuit in the series is in fluid communication with the clearwell stage and configured to control the volume/level of the first solution in each of the preceding forward osmosis units. In some embodiments, the separation system includes a filtration unit, a reverse osmosis unit, and a by-pass circuit all in fluid communication with the plurality of forward osmosis units. The filtration unit can include a first chamber having an inlet fluidly coupled to at least one of the forward osmosis units for receiving at least a first portion of the dilute draw solution, a second chamber having an outlet fluidly coupled to the reverse osmosis unit for transferring a less dilute draw solution thereto, and a filtration membrane separating the first chamber from the second chamber and configured for partially removing solutes from the dilute draw solution, thereby forming the less dilute draw solution in the second chamber. The removed solutes can be returned to at least one of the forward osmosis units. The reverse osmosis unit can include a first chamber having an inlet fluidly coupled to at least one of the forward osmosis units for receiving at least a second portion of the dilute draw solution and an outlet fluidly coupled to at least one of the forward osmosis units for introducing the concentrated draw solution thereto, a semi-permeable membrane coupled to the first chamber, and a second chamber coupled to the semi-permeable membrane and configured for receiving the solvent fluxed through the membrane, thereby leaving the concentrated draw solution in the first chamber for transfer to the forward osmosis units. The by-pass circuit is configured to selectively direct the first and second portions of the dilute draw solution to the filtration unit and/or the reverse osmosis unit. In various embodiments, the clearwell stage also includes means for dewatering the more concentrated first solution, such as a filter press or other mechanical or thermal process. In some embodiments, the solids settle out of the first solution in the clearwell via gravity. The clearwell stage can also include means for recovering at least a portion of the solids or a substance present therein (e.g., seed material that was added to the first solution to control the behavior of the solids therein) for reuse or further processing.

In yet another aspect, the invention relates to a method of extracting a solvent from a first solution. The method is carried out with a plurality of forward osmosis units, where each forward osmosis unit includes a semi-permeable membrane assembly having a framework and a plurality of membranes coupled thereto and having first sides and second sides, where the first sides define a first plurality of channels for receiving the first solution and the second sides define a second plurality of channels for receiving a concentrated draw solution, wherein the membranes are configured for osmotically separating the solvent from the first solution, thereby forming a more concentrated first solution in the first plurality of channels and a dilute draw solution in the second plurality of channels; and a tank configured for receiving the semi-permeable membrane assembly and the first solution, wherein the semi-permeable membrane assembly is at least partially submerged within the tank. The first solution includes dissolved solids therein, for example, about 5,000 ppm to about 40,000 ppm, preferably about 10,000 ppm to about 30,000 ppm, and more preferably about 15,000 ppm to about 25,000 ppm TDS. The method includes the steps of providing a plurality of forward osmosis units arranged in a series configuration, introducing the first solution to a first forward osmosis unit in the series, introducing the concentrated draw solution to a last forward osmosis unit in the series, fluxing a portion of the solvent from the first solution across the plurality of membranes into the concentrated draw solution, recirculating the more concentrated first solution through each tank to maintain the solids in solution, maintaining a predetermined concentration of solids within the more concentrated first solution, directing the dilute draw solution to a separation system, separating the dilute draw solution into the concentrated draw solution and the solvent stream, and recycling the concentrated draw solution to the plurality of forward osmosis units.

In various embodiments of the method, the step of maintaining a predetermined concentration of solids within the more concentrated first solution may include directing at least a portion of the more concentrated first solution to a hydrocyclone via the recirculation system, wherein the hydrocyclone is configured to control the concentration of solids within the first solution within the tank and directing an overflow portion of the more concentrated first solution to a subsequent forward osmosis unit in the series via the hydrocyclone, as necessary. In some embodiments, necessity depends on % concentration of solids maintained in the tank. For example, if the concentration of solids in the more concentrated first solution is too high, the hydrocyclone will pass a portion of the more concentrated first solution and solids contained therein to a subsequent forward osmosis unit. In some embodiments, an overflow portion of the first solution is passed to a subsequent unit based on fluid levels. The method can also include the step of directing the more concentrated first solution from the last forward osmosis unit in the series to a clearwell. The method can include the step of removing additional solvent from the more concentrated first solution in the clearwell, leaving a substantial portion of solids behind. A substance can be extracted from the solids left behind (e.g., seed material) that can be reused within the system, sent for further treatment, or recovered as is.

In another aspect, the invention relates to a system for osmotic extraction of a solvent from a first solution. The system includes a plurality of forward osmosis units, where each unit includes a semi-permeable membrane assembly having a framework and a plurality of membranes coupled thereto and having first sides and second sides, where the first sides define a first plurality of channels for receiving the first solution and the second sides define a second plurality of channels for receiving a concentrated draw solution, and a tank configured for receiving the semi-permeable membrane assembly and the first solution, wherein the semi-permeable membrane assembly is at least partially submerged within the tank. The first solution includes solids (e.g., dissolved and/or suspended) therein and the membranes are configured for osmotically separating the solvent from the first solution, thereby forming a more concentrated first solution in the first plurality of channels and a dilute draw solution in the second plurality of channels. The system further includes a separation system in fluid communication with the plurality of forward osmosis units and configured for receiving the dilute draw solution from the forward osmosis units, a plurality of recirculation systems, each in fluid communication with a corresponding forward osmosis unit and configured for recirculating the more concentrated first solution through each tank, and at least one dewatering sub-system in fluid communication with at least one of the recirculation systems or at least one of the tanks and configured to control a concentration of solids within the first solution within each tank. The separation system includes means for separating the dilute draw solution into the concentrated draw solution and a solvent stream. In some embodiments, the overall system includes a separation system for each forward osmosis unit. In various embodiments, the recirculation system recirculates the more concentrated first solution continuously. In addition, the recirculation system can be used to introduce the first solution to one or more of the forward osmosis units. The dewatering sub-system and/or the recirculation system can also be used to forward at least a portion of the first solution to a subsequent forward osmosis unit.

In various embodiments of the foregoing aspect, the dewatering sub-system includes one or more tubular filter presses, each having one or more filter tubes. In some embodiments, the one or more filter tubes include a spiral rib disposed on an interior surface thereof. In some embodiments, the dewatering sub-system replaces the hydrocyclone circuit described above, while in other embodiments the dewatering sub-system is integrated with the hydrocyclone circuit(s). Additionally, the system may include an aeration system for introducing air in to the tanks. In some embodiments, the aeration system is a dissolved air flotation system. The system can also include a clearwell stage in fluid communication with the plurality of forward osmosis units and configured for receiving the more concentrated first solution. In some embodiments of the system, the plurality of forward osmosis units are arranged in series and the clearwell stage is disposed proximate and in fluid communication with a last forward osmosis unit in the series. The separation system can include a filtration unit, a reverse osmosis unit, and a by-pass circuit all in fluid communication with the plurality of forward osmosis units. In additional embodiments, the clearwell stage further includes means for recovering at least a portion of the solids or a substance present therein.

In another aspect, the invention relates to a method of extracting a solvent from a first solution. The method includes the step of providing a plurality of forward osmosis units arranged in a series configuration, where each unit includes a semi-permeable membrane assembly having a framework and a plurality of membranes coupled thereto and having first sides and second sides where the first sides define a first plurality of channels for receiving the first solution and the second sides define a second plurality of channels for receiving a concentrated draw solution. The membranes are configured for osmotically separating the solvent from the first solution, thereby forming a more concentrated first solution in the first plurality of channels and a dilute draw solution in the second plurality of channels. The plurality of forward osmosis units further include a tank configured for receiving the semi-permeable membrane assembly and the first solution, where the semi-permeable membrane assembly is at least partially submerged within the tank. The method includes the additional steps of introducing the first solution to a first forward osmosis unit in the series, introducing the concentrated draw solution to a last forward osmosis unit in the series, fluxing a portion of the solvent from the first solution across the plurality of membranes into the concentrated draw solution, recirculating the more concentrated first solution through each tank to maintain the solids in solution, maintaining a predetermined concentration of solids within the more concentrated first solution, directing the dilute draw solution to a separation system, separating the dilute draw solution into the concentrated draw solution and the solvent stream, and recycling the concentrated draw solution to the plurality of forward osmosis units.

In various embodiments of the method, the step of maintaining a predetermined concentration of solids within the more concentrated first solution includes directing at least a portion of the more concentrated first solution to a dewatering sub-system via the recirculation system, where the dewatering sub-system is configured to control the concentration of solids within the first solution within the tank and recover additional water, similar to the hydrocyclone circuit described above. The dewatering sub-system can include a tubular filter press and the method can further include the steps of directing at least a portion of the additional water to the first solution and directing a portion of recovered solids to a secondary process, such as a settling process, a grinding process, or some other separation process. The method can also include the step(s) of directing the more concentrated first solution from the last forward osmosis unit in the series to a clearwell and/or extracting a substance from the recovered solids.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Accordingly, these and other objects, along with advantages and features of the present invention herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention and are not intended as a definition of the limits of the invention. For purposes of clarity, not every component may be labeled in every drawing. In the following description, various embodiments of the present invention are described with reference to the following drawings, in which:

FIGS. 4A and 4B are schematic representations of a portion of a filter press used in the system of FIG. 3.

DETAILED DESCRIPTION

Figure 1:
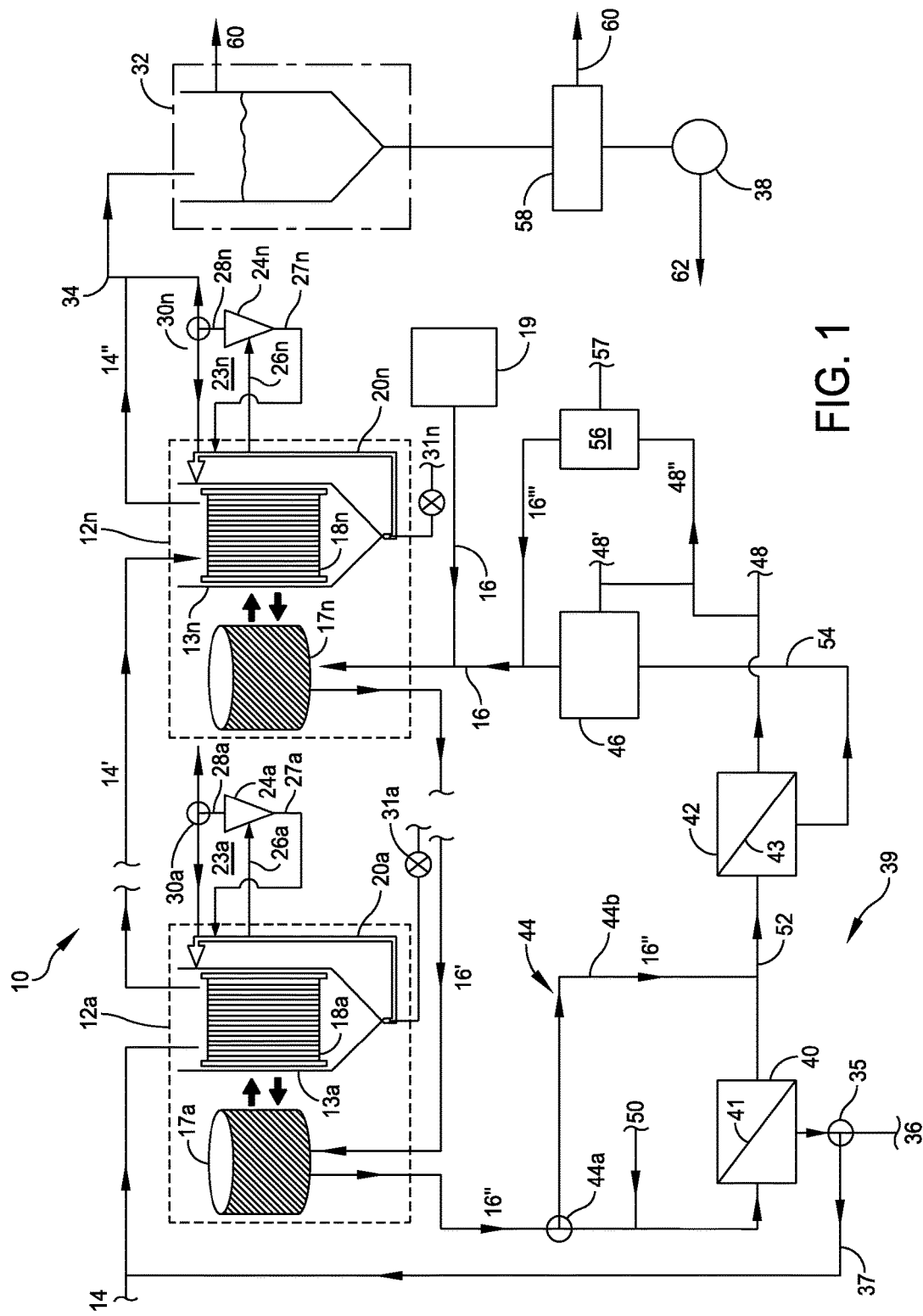
FIG. 1 is a schematic representation of a system for osmotic extraction of a solvent in accordance with one or more embodiments of the invention.

In accordance with one or more embodiments, an osmotic method for extracting water from an aqueous solution may generally involve exposing the aqueous solution to a first surface of a forward osmosis membrane. A second solution, or draw solution, with an increased concentration relative to that of the aqueous solution may be exposed to a second opposed surface of the forward osmosis membrane. Water may then be drawn from the aqueous solution through the forward osmosis membrane and into the second solution generating a water-enriched solution via forward osmosis, which utilizes fluid transfer properties involving movement from a less concentrated solution to a more concentrated solution. The water-enriched solution, also referred to as a dilute draw solution, may be collected at a first outlet and undergo a further separation process to produce purified water. A second product stream, i.e., a depleted or concentrated aqueous process solution, may be collected at a second outlet for discharge or further treatment. Alternatively, the various systems and methods described herein can be carried out with non-aqueous solutions.

In accordance with one or more embodiments, a forward osmosis membrane module may include one or more forward osmosis membranes. The forward osmosis membranes may generally be semi-permeable, for example, allowing the passage of water, but excluding dissolved solutes therein, such as sodium chloride, ammonium carbonate, ammonium bicarbonate, and ammonium carbamate. Many types of semi-permeable membranes are suitable for this purpose provided that they are capable of allowing the passage of the solvent (e.g., water) while blocking the passage of the solutes and not reacting with the solutes in the solution. In some embodiments, the membrane(s) may have high selective permeability properties, thereby allowing the aforementioned solutes to pass through the membrane; however alternative types of membranes may be used to maximize performance of the system for a particular application, for example, feed chemistry, draw solution chemistry, ambient conditions, etc.

In accordance with one or more embodiments, at least one forward osmosis membrane may be positioned within a housing or casing. The housing may generally be sized and shaped to accommodate the membranes positioned therein. For example, the housing may be substantially cylindrical if housing spirally wound forward osmosis membranes. The housing of the module may contain inlets to provide feed and draw solutions to the module as well as outlets for withdrawal of product streams from the module. In some embodiments, the housing may provide at least one reservoir or chamber for holding or storing a fluid to be introduced to or withdrawn from the module. In at least one embodiment, the housing may be insulated.

In accordance with one or more embodiments, a forward osmosis membrane module may generally be constructed and arranged so as to bring a first solution and a second solution into contact with first and second sides of a semi-permeable membrane, respectively. Although the first and second solutions can remain stagnant, it is preferred that both the first and second solutions are introduced by cross flow, i.e., flows parallel to the surface of the semi-permeable membrane. This may generally increase membrane surface area contact along one or more fluid flow paths, thereby increasing the efficiency of the forward osmosis processes. In some embodiments, the first and second solutions may flow in the same direction. In other embodiments, the first and second solutions may flow in opposite directions. In at least some embodiments, similar fluid dynamics may exist on both sides of a membrane surface. This may be achieved by strategic integration of the one or more forward osmosis membranes in the module or housing.

In accordance with one or more embodiments, draw solutes may be recovered for reuse. A separation system may strip solutes from the dilute draw solution to produce product water substantially free of the solutes. In some embodiments, the separation system may include a distillation column or other thermal or mechanical recovery mechanism. Draw solutes may then be returned, such as by a recycling system, back to the concentrated draw solution. Gaseous solutes may be condensed or absorbed to form a concentrated draw solution. An absorber may use dilute draw solution as an absorbent. In other embodiments, product water may be used as an absorbent for all or a portion of the absorption of the gas streams from a solute recycling system. Examples of different osmotically driven systems, including separation/recovery systems are described in U.S. Pat. Nos. 6,391,205 and 8,002,989; and U.S. Patent Publication Nos. 2011/0203994, 2012/0273417, 2012/0267306, 2012/0267307, and 2012/0067819, and U.S. Patent Publication No. 2014/0224718; the disclosures of which are hereby incorporated by reference herein in their entireties.

FIG. 1 depicts an osmotically driven membrane system 10 that utilizes one or more forward osmosis modules 12a, 12"n" (generally 12, where "n" represents a virtually unlimited number of modules (i.e., stages) as may be included in any particular embodiment of the system 10), which can be arranged in series or parallel to suit a particular application. As shown in FIG. 1, the forward osmosis modules 12 are arranged in series and are in fluid communication with a separation/recycling system 39. In some embodiments, the system 10 includes between 2 and 10 stages, more particularly 4 to 6 stages. Generally, the forward osmosis modules 12 are configured and work similarly to those described in the patents and applications incorporated hereinabove. In addition, the separation/recycling system 39 is similar to those described in the incorporated patents and patent applications. Only one separation/recycling system 39 is depicted; however, multiple systems 39 may be used to suit a particular application (e.g., a single system 39 sized and plumbed for each forward osmosis module 12 or for multiple systems/stages in series or parallel). The system also includes a clearwell 32 and associated components, as described in greater detail below, in fluid communication with the forward osmosis modules 12 for processing a concentrated feed solution 14" (e.g., a residual brine). The system 10 generally includes various fluid transfer devices (e.g., pumps, energy recovery devices), valves, sensors (with or without visual indicators, such as gauges or status lights), and associated plumbing to carry out the various processes. Some of the pumps, valves, etc. may be omitted from the drawings for clarity.

The basic operation of the system 10 proceeds as follows: A feed stream 14 is introduced into the first forward osmosis module 12a that is divided into first chamber(s) or side(s) and second chambers/sides by semi-permeable membrane(s). The feed stream 14 is directed to each successive forward osmosis module 12a, 12n and exits the last module 12n as a concentrated feed stream 14". The specific number and arrangement of forward osmosis modules 12 will be selected to suit a particular application (e.g., starting concentration and required final concentration of the feed stream, flux and flow rates, etc.) and can include any number of modules arranged in series and/or parallel. For example, multiple parallel pairs of forward osmosis modules may be arranged in series. In the embodiment shown in FIG. 1, a concentrated draw solution 16 is introduced to the last module 12n in the series of forward osmosis modules 12 and to the opposite sides of the membranes as the feed stream 14, thereby providing a cross-flow between the feed stream 14 and the draw solution 16, as the draw solution 16 is directed through the successive modules 12. However, the concentrated draw solution 16 could be first introduced into the same module 12a as the feed stream 14 is first introduced and/or could be introduced into multiple stages concurrently (i.e., in parallel) to suit a particular application. In addition, the various streams/solutions can be adjusted/divided as necessary to achieve an optimum differential osmotic pressure as necessary to maintain the desired flux across the membranes.

The feed stream 14 becomes more concentrated as it passes through each forward osmosis module 12, with the afore-mentioned concentrated feed stream 14" being discharged from the final forward osmosis module 12n. The concentrated draw solution 16 becomes diluted as it passes through each successive forward osmosis module 12 due to the passage of solvent across the membranes from the feed stream into the draw solution; discharging a dilute draw solution 16" from the "first" forward osmosis module 12a. Typically, the concentrated feed stream 14" is discarded or sent for further processing, while the dilute draw solution 16" is directed to the separation/recycling system 39 to recover draw solutes/re-concentrate the draw solution and recover product solvent (e.g., water) 48. Alternatively or additionally, a portion of the more concentrated feed stream exiting each forward osmosis module 12 can be redirected back to and combined with the initial feed stream 14, directed to a subsequent forward osmosis module 12 as necessary to maintain an optimum differential osmotic pressure across the membranes, and/or recirculated within the module 12, as described in greater detail below.

Generally, when operating the modules 12 in a series arrangement, it is usually desirable to operate with a cross-flow of the feed stream 14 and the draw solution 16, as shown in FIG. 1 and described herein, so that the feed stream concentration increases as it flows through the modules 12 and the draw solution concentration decreases as it flows through the modules 12. This arrangement results in the least concentrated feed stream opposing the least concentrated draw solution across the membrane in module 12a and the most concentrated feed stream opposing the most concentrated draw solution across membrane in module 12n. This results in an optimum differential osmotic pressure across all of the modules 12.

The forward osmosis modules 12 shown in FIG. 1 include tanks 13a, 13n configured for receiving the feed stream(s) 14, 14' and holding one or more membrane cassette assemblies 18a, 18n. Typically, the membrane cassettes 18 include a plurality of planar membranes arranged in a plate and frame type of configuration (although other configurations are contemplated and considered within the scope of the invention) and at least partially submerged within the tanks 13. However, in some embodiments, the membrane cassettes are self-contained within a housing with the necessary inlets and outlets. Generally, the cassettes 18 include channels between the membranes (e.g., between the membrane active layers) though which the feed stream 14, 14' passes (e.g., is pumped therethrough). The cassettes 18 include additional, alternating channels (e.g., between the membrane support layers) through which the concentrated draw solution 16, 16' passes (e.g., drawn therethrough under vacuum). The cassettes 18 will also typically include end plates and/or manifolds for securing the membrane plates together and providing fluid ingress and egress to the cassettes 18 (see FIG. 2).

In various embodiments, the system 10 includes a source 19 (e.g., a holding tank) of concentrated draw solution 16 that is directed to each forward osmosis module 12. Alternatively or additionally, each forward osmosis module 12 can include a draw solution tank 17a, 17n located proximate the membrane tanks 13. In some embodiments, the draw solution tank(s) 17 are used to provide a sufficient flow of draw solution to and from the modules 12 (e.g., for priming the module 12) or sufficient volume to allow for mixing of the concentrated draw solution 16, 16' entering the tank 17 from another stage 12 and the slightly less concentrated draw solution exiting the module 12 and being returned to the tank 17. In some embodiments, the tanks 17 comprise multiple chambers, for example, one chamber for introducing the more concentrated draw solution to the module 12 and a second chamber for transferring the diluted draw solution to the next module/stage 12. In other embodiments, the tanks 17 directly exchange the concentrated and less concentrated draw solutions with the forward osmosis modules 12. For example, the tank 17 receives concentrated draw solution 16' from tank 17n of module 12n (e.g., via a pump and appropriate valves and controls), the concentrated draw solution is directed from the tank 17 to the module 12 and a slightly less concentrated draw solution exits the module 12 and is returned to the tank 17 (e.g., under vacuum), and finally the less concentrated draw solution (the dilute draw solution 16" in the case of module 12a, i.e., the first module) exits the tank 17 and is either directed to the next stage 12 of the system 10 or to the separation system 39 if exiting as the final dilute draw solution 16". Generally, the concentration levels of the draw solutions exchanging between the tank 17 and the module 12 are relatively minor and mixing within the tank 17 does not have any appreciable impact on the osmotic pressure that can be generated by the draw solution.

As part of an individual forward osmosis module 12, or as part of the circuitry between each FO stage, the system 10 includes recirculation systems 20a, 20n. Each recirculation system 20 can include a hydrocyclone circuit 23a, 23n. As shown in FIG. 1, the feed stream 14 enters the first stage under pressure (e.g., pumped or gravity fed) to the top of the forward osmosis module tank 13. A portion of the solvent present in the feed stream 14 fluxes through the membrane and dilutes the concentrated draw solution 16'. Simultaneously, the recirculation system 20 draws a portion of the feed from the bottom of the tank 13 and returns this slightly more concentrated feed to the top of the tank 13. Typically, the recirculation system 20 will operate continuously, regardless of the state of the feed stream, to prevent solids from settling within the tank 17, which could compromise the operation of the entire system 10. The feed stream volume entering and being recirculated through the forward osmosis module 12 will result in at least a portion of the more concentrated feed stream 14' overflowing to the next forward osmosis module 12n. Typically, the recirculation system 20 includes a pump (or other pressure transfer device) and the plumbing necessary to move a portion of the feed stream from the bottom to the top of the tank; however, in some embodiments, the recirculation system 20 may circulate the feed from the top to the bottom of the tank 13 or between stages. In some embodiments, the recirculation system 20 is eliminated entirely. In some embodiments, the overflow feed(s) lines 14' are optional and all or any portion of the feed stream overflow can be directed to subsequent modules/stages 12 via the recirculation system(s) 20, without the need for the overflow feed lines 14'.

Additionally, the recirculation system 20 can include valves and sensors as necessary to control operation of the system 20. For example, sensors within the recirculation system 20, or within the forward osmosis module 12 itself, can signal the need for operation of the recirculation system 20 and start the pump and/or open/close valves as necessary. One such event may occur after the system is primed and has reached a steady state of operation and the operator/system wants to maintain a certain composition of the feed. Additionally, the recirculation system 20 can be used to keep solids in solution (see seeded slurry discussion below), create shear forces to reduce or eliminate fouling/scaling on the membrane surface, introduce additional substances into the feed (e.g., seeds or anti-scalants via a valve and port arrangement), and control the rate at which solvent is removed from the feed stream 14 and/or a particular stage 12. For example, by controlling the flow rate through the cassette 18, one can control the rate at which the solvent is fluxed through the membrane (e.g., the solvent can be pulled out of the system in a "gentle" manner by recycling the feed through the cassette 18 at a higher velocity than the draw solution is pulled through the cassette 18). The removing of the solvent "gently" will assist with maintaining the seed/solids uniformity through the cassette channels, which reduces clumping of the solids on the membrane surfaces. In some embodiments, the recirculation system is also used to introduce the feed stream 14 to the module 12a, for example, the feed may be connected directly to the recirculation system 20 to simplify piping.

In some embodiments, for example where seeds are added to the forward osmosis module 12 to control fouling and/or the behavior of various solutes within the feed stream 14, the recirculation system 20 may include a hydrocyclone circuit 23a, 23n, although the hydrocyclone circuit 23 can also be used for handling solids within the feed stream 14 (e.g., where no pretreatment is performed). In some embodiments, the osmotically driven membrane system 10 may incorporate the use of seeds, for example, in the feed solution, to enhance the operation of the system 10. Generally, the addition of the seeds will turn the feed solution 14 into a seeded slurry, as described in greater detail in the incorporated references and U.S. patent application Ser. No. 14/547,299, filed Nov. 19, 2014; the disclosure of which is hereby incorporated by reference herein in its entirety. In accordance with embodiments where the osmotically driven membrane system 10 operates with seeds added to the feed solution 14 to create a seeded slurry, the seeds can be added to the feed/slurry to help control the behavior of the slurry within the system 10. For example, the seeds will act as an alternative nucleation point for other solutes within the solution to, for example, prevent those solutes from fouling a membrane surface, settling out of the solution, or negatively impacting the performance of the system. In various embodiments, the seeds are added directly into the feed stream 14 or are added to the feed via the recirculation system 20.

Additionally, the seeds may be added to each forward osmosis module stage 12 in series or to various combinations of stages. For example, in one embodiment, the seeds are added to the second and last stages of the system. Generally, the amount and order of introduction will vary to suit a particular application. The size and composition of the seeds can be selected to suit a particular application as well, and in some embodiments, may be recoverable for reuse, as discussed herein. In one embodiment, the seeds comprise calcium sulfate (CaSO4). Alternatively or additionally, the seed material could comprise a substance found within the feed stream 14. In one or more embodiments, the seeds are added in combination with a dispersant. Generally, the seed volume can be selected to address a particular feed chemistry. The amount of seeding material (and in some embodiments dispersant material as well) required is generally not tied to the flow rate or volume of the feed stream 14. In various embodiments, the seeds can be added at a dose of about 40 g of seed material for every 200 mg of dispersant (a ratio of 200:1); however, other amounts and ratios (e.g., 50:1 to 500:1) are contemplated to suit a particular application and are considered within the scope of the invention.

Generally, the hydrocyclone 24a, 24n is used to control solids size and dwell time within a particular forward osmosis module 12. The hydrocyclone circuit 23a, 23n is used to feed/forward the right amount of solids (typically with some amount of clear solvent or portion of feed stream) generated in each stage to the following stage in the system 10. A typical hydrocyclone includes an inlet and at least one each of an overflow port and an underflow port, and will be sized to separate solids based on the size/weight thereof. As used in the system 10 of FIG. 1, the hydrocyclone circuits 23 control and maintain the solids concentration level in the tanks 13. Generally, the hydrocyclone 24 is sized so that in an optimal situation, all of the feed solids are returned to the tank 13 via the underflow line 27. Ideally, the hydrocyclone circuit 23 will maintain a concentration level in the tank 13 of about 1% to about 30% of solids, preferable, about 2% to about 20%, and more preferably about 4% to about 10%. The hydrocyclone 24 will also pass a portion of the feed having a high salinity, but lean on solids, to the next stage 12 in the system 10. In addition, the hydrocyclone circuits 23 for each forward osmosis unit can be sized and configured differently so as to maintain different solids concentrations in different modules/stages 12. For example, in some embodiments, it may be beneficial to maintain increased concentration levels in subsequent forward osmosis modules 12 when the modules are oriented in series.

In normal operation, a portion of the feed 14 is withdrawn from the bottom of the tank 13 (or an area proximate thereto) via the recirculation system 20, with a portion of that recirculated feed 26a, 26n being directed to the inlet of the hydrocyclone 24. Alternatively, the hydrocyclone circuit 23 could be independent of the recirculation system 20. A certain amount of the recirculated feed and solids (e.g., the heavier/larger solids) exit via the underflow port 27a, 27n of the hydrocyclone 24 and are directed back to the tank 13, either directly or via the recirculation system 20. A remaining portion of the recirculated feed and solids (predominately the more concentrated brine with some lighter/smaller solids) exit the overflow port 28a, 28n. At least a portion of the overflow stream 28 is directed to the next stage 12, either directly or via the overflow feed stream 14'. In some embodiments, a portion of the overflow stream is also redirected back to the tank 13 via, for example, a tee or three-way valve 30a, 30n in that line. The valve 30 can be used to control the flow rate and amount of feed and solids directed to the next stage and/or returned to the current stage 12, which can allow an operator to control operation of the system 10. The hydrocyclone circuit 23 also allows the operator to control the size of the seeds/solids introduced to or passing through a particular stage.

As previously discussed, the hydrocyclone circuits 23 control the solids concentration in the tanks 13, which is accomplished based on the failure or roping point of the hydrocyclone 24. If the concentration level is too low, the hydrocyclone will direct substantially all of the solids back to the tank 13. If the concentration level is too high, the hydrocyclone will direct the excess solids through the overflow 28 and onto the next stage 12 of the system 10, which in turn will control the solids concentration in its tank 13n via the use of its hydrocyclone circuit 23n. Again, in normal operation, substantially all solids should be returned to the tank until the desired concentration of solids is reached (e.g., about 4-10%) than the excess solids will exit the overflow port 28. As shown in FIG. 1, the overflow can be proportionally forwarded to both the next stage and current stage via the tee or valve 30. Additional embodiments of the hydrocyclone circuit 23 include an optional blow down or by-pass 31a, 31n that can be used to remove high amounts of solids and/or divert additional solids to any subsequent stage 12. In one or more embodiments, the system 10 monitors the flux rate of any particular module 12 and adjusts the solids concentration level in a particular module 12 in response thereto. For example, if the system 10 senses a drop in flux rate in forward osmosis module 12a, this may be an indication that the concentration of solids in tank 13a is too high, at which point the system controller can actuate the by-pass 31a to lower the solids concentration in the tank 13a. The by-passed solids can be directed to a subsequent module 12, returned to the feed stream 14, and/or discarded.

After the last forward osmosis module/stage 12n, the residual brine 14" (i.e., concentrated feed) is directed to the clearwell 32. Generally, the clearwell 32 is the final stage of the system 10 and it is where the brine can be removed from the solids and the handling of solids can be regulated. Generally, the clearwell 32 can reduce the chemical demand of the system by, for example, recycling the seed material as discussed below. In various embodiments, the solids can be allowed to settle out or thicken within the clearwell 32, while the brine, less the solids, 60 can be removed from the system 10. The brine 60 can be recycled back to the feed stream 14, sent for further processing, or otherwise discarded. In some embodiments, the system 10 includes a filter press 58 that can be used to remove additional solvent/brine from the solids, leaving sludge behind. The system 10 can also include means 38 for recovering or otherwise reconditioning any seed material within the solids. In one embodiment, the means 38 include a grinder or press for separating seed material from the solid waste. The seed material can be recycled back (line 62) to the feed stream 14, any particular forward osmosis module 12, or stored for later reuse. The remaining sludge can be sent for further treatment or otherwise discarded.

In some embodiments, the clearwell 32 is also in fluid communication with the hydrocyclone circuit 23n of the last stage. The hydrocyclone circuit 23n of the last stage operates essentially the same as previously described with respect to the earlier stages. The hydrocyclone 24n, in conjunction with the clearwell 32, provides for automated hydraulic balancing of the system 10 with bulk solids management. Generally, the level within the clearwell 32 will vary during operation of the system 10. To account for low levels in the system, the overflow line 30n of the hydrocyclone 24n can include a jog 34 to set the levels of the preceding tanks. By setting the level of the jog 34 no higher than top edge of tanks 13, the tanks 13 will stay filled and only when at a maximum level will brine flow to the clearwell 32. This arrangement will enable each module 12 to maximize its efficiency by maximizing membrane surface area and exposure time to the feed stream.

As previously described, the system 10 includes one or more forward osmosis modules 12 (e.g., multiple units arranged in series and/or parallel to suit a particular application) in fluid communication with one or more separation systems 39. In various embodiments, the separation system(s) incorporates one or more nanofiltration/ultrafiltration units 40, one or more reverse osmosis units 42, and optionally an additional water recovery system 46 (e.g., a membrane distillation unit), all in various states of fluid communication. The separation system 39 can also include a brine maker 56. The separation system 39 includes all of the necessary valves, pumps, piping, sensors, controls, etc. to suit a particular application.

Generally, the separation system 39 includes the nanofiltration (NF) or ultrafiltration (UF) unit(s) 40 for initially treating at least a portion of the dilute draw solution 16" and the reverse osmosis unit(s) 42 for treating the dilute draw solution 52 processed by the NF/UF unit 40, the dilute draw solution 16" directly outputted by the forward osmosis units 12, or both. One or more of either or both of the units 40, 42 can be arranged in series and/or parallel as necessary to suit a particular application. The system 39 may optionally include a membrane distillation unit 46 or other thermal/mechanical recovery system for additional concentration of the draw solution and/or to recover additional product water.

In one or more embodiments, the dilute draw solution 16" may include one or more solutes that have selectively permeated across the FO membrane, such as calcium ions (Ca2+), magnesium ions (Mg2+) or various sulfates, sulfonates, or generally other sparingly soluble inorganic solutes or organic constituents. At least a portion of the dilute draw solution 16" (including the permeated solutes) can be directed to the NF/UF unit 40. In some embodiments, all or a portion of the dilute draw solution can by-pass the NF/UF unit 40 via by-pass circuit 44 (valve arrangement 44a and line(s) 44B) and be sent directly to the reverse osmosis unit(s) 42 depending, in part, on the condition/chemistry of the dilute draw solution 16", 52. In some embodiments, the by-pass valve arrangement 44a can include a three-way valve that can meter portions of the dilute draw solution 16" to the NF/UF unit 40 and/or the reverse osmosis unit 42. Alternatively, multiple valves can be used to selectively direct the dilute draw solution 16", or portions thereof, to the appropriate treatment process.

Typically, the NF/UF membrane 41 will be a "loose" NF membrane (or possibly a "tight" UF membrane) that allows at least a substantial portion of the draw solutes (e.g., NaCl) to pass therethrough, while blocking at least a substantial portion of the permeated solutes. Generally, a membrane 41 with a rejection rate of only about 30% is acceptable (e.g., a 0%-20% rejection if NaCl draw solutes are used is preferable), although what is considered a desirable rejection rate will vary depending on the various system conditions, for example, solution chemistries, operating parameters, and ambient conditions. In one or more embodiments, draw solutes comprising monovalent compounds, such as NaCl, pass more readily through the NF membrane 41 where they can be concentrated in the reverse osmosis unit 42 for use as the concentrated draw solution 16, while the divalent or polyprotic compounds, such as Ca2+, sulfates, or organic compounds are rejected by the membrane 41 and returned to the feed stream 14. These solutes can be directed to the system feed 14 via line 37, which may include any necessary pumps, valves, sensors, controls, etc. to return the solutes to the feed 14. In one or more embodiments, only about 10% of the dilute draw solution 16" is directed to the NF/UF unit 40, which acts similar to a solute blow-down process to remove at least a portion of undesirable solutes that may build up in the draw solution and/or assist with the balancing of ions between the feed and draw sides of the forward osmosis module(s) 12, thereby eliminating the need for a separate blow-down circuit. In one embodiment, a three-way valve 35 is used to return at least a portion of the NF unit retentate to the feed stream 14 via line 37 and/or to discharge a portion thereof as the blow down via outlet 36, which can be plumbed to a proper disposal mechanism.

Additionally, the separation system 39/by-pass circuit 44 may include means 50 (e.g., a port and valve arrangement, with or without a tank, metering/mixing device, etc.) for introducing one or more additives to the dilute draw solution 16" prior to processing. In some embodiments, a dispersant (e.g., sodium lignin sulfonate) may be added to the dilute draw solution 16" prior to the NF/UF unit 40 to facilitate the introduction of the additive to the feed stream 14, as at least a substantial portion of the additive will be rejected by the NF/UF membrane allowing it to be returned to the feed with the undesirable solutes. In some embodiments, the additive can reduce or eliminate fouling or scaling of the NF/UF membrane prior to being directed to the feed stream 14. Alternatively or additionally, the introduction means 50 can be used to introduce other additives (e.g., anti-scalants, corrosion inhibitors, complexing agents, dispensing agents, sequestrants, sludge conditioners, or sludge inhibitors) to other areas of the system 10. The system 10 may include similar means for introducing additional draw solutes to the draw solution. In some embodiments, these means include a brine maker 56 (e.g., where the main draw solute is NaCl) to replace any solutes that may have reverse fluxed through the FO membranes or otherwise have been lost in the draw solution recovery process. These means 56 will typically be disposed proximate to where the concentrated draw solution is introduced to the forward osmosis module(s) 12; however, other locations are possible to suit a particular application. In one embodiment, the brine maker 56 includes means 57 (e.g., a port and valve arrangement) for introducing the draw solutes and similar means for introducing a solvent 48" for making the brine/draw solution 16'. Other substances can also be added to the brine maker 56 to further condition the draw solution, such as an acid to lower the pH of the draw solution, for example, citric acid, sulfuric acid, hydrochloric acid, or ethylenediaminetetraacetic acid (EDTA). Other substances include a chelator or surfactant that can reverse flux through the membrane to reduce/eliminate fouling on the active layer of the membrane. In some embodiments, the solvent 48" is a portion of the solvent 48 recovered from the separation system 39.

The diluted draw solution 16", 52 is pressurized in the reverse osmosis unit(s) 42 (e.g., via a pump) forcing solvent through the membrane(s) 43. This product solvent 48 can be removed from the reverse osmosis unit(s) 42 as, for example, product water that can be used as is, be disposed of, sent for further processing, or employed as a heat transfer fluid within an integrated system. The draw solution that remains on the retentate side of the reverse osmosis unit(s) 42 is now re-concentrated draw solution 54 and can be sent back to the forward osmosis modules 12 as is, or sent for further processing to further concentrate the draw solution and/or recover additional product solvent, as necessary to suit a particular application. As shown in FIG. 1, the concentrated draw solution 54 exiting the reverse osmosis unit 42 is directed to the optional membrane distillation unit 46 for further concentration, producing additional product water 48' and a final concentrated draw solution 16.

Figure 2:
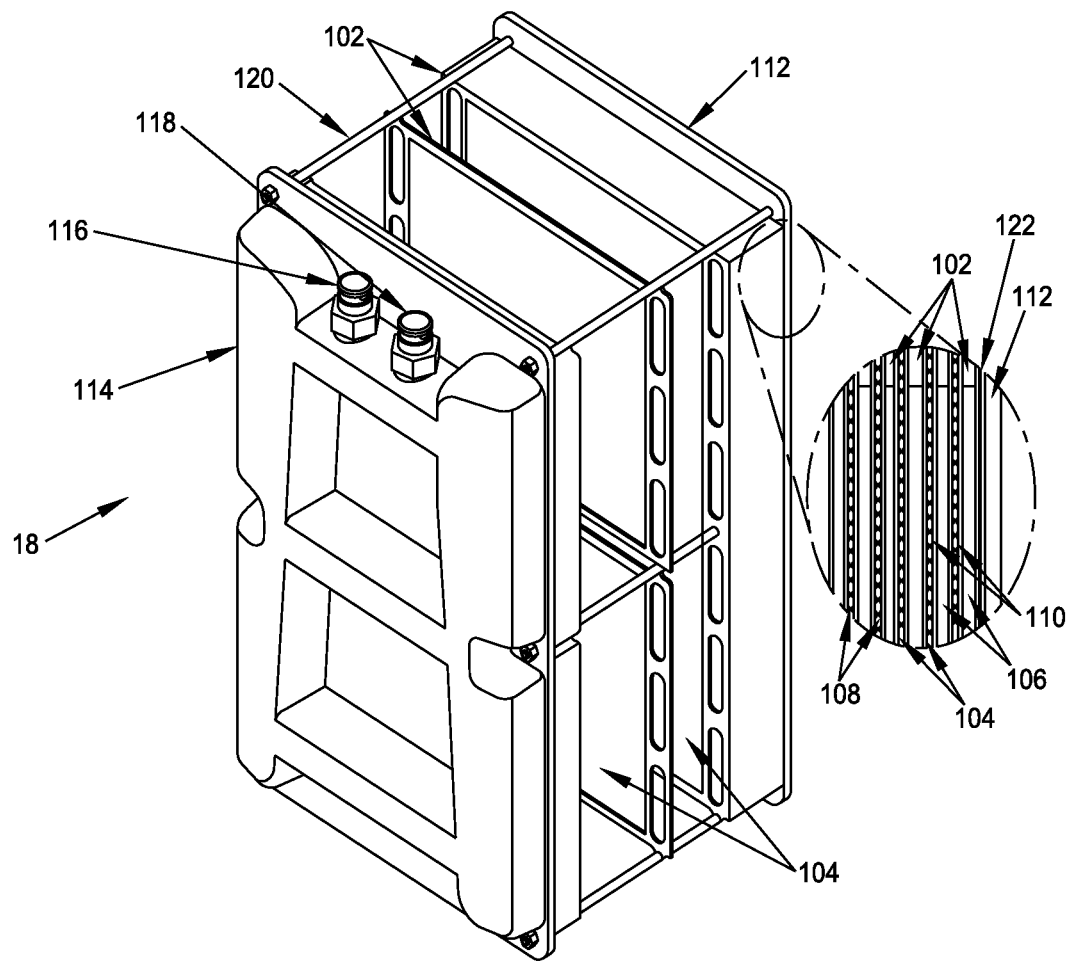
FIG. 2 is a schematic perspective view of an exemplary forward osmosis module for use in the system of FIG. 1 in accordance with one or more embodiments of the invention.

FIG. 2 depicts one possible configuration of a cassette assembly 18 for use in the forward osmosis modules 12. As shown in FIG. 2, the cassette 18 includes a plurality of plates 102 with a sheet of membrane 104 attached to each side of each plate 102. Generally, the membrane sheets 104 will be oriented so that the active layers of the membrane sheets are facing each other in an alternating manner, with the plate thickness defining a feed channel 106 therethrough. Because the plates 102 and membrane sheets 104 are arranged in this alternating manner, there will also be support layers of the membrane sheets facing each other and forming draw channels 108 therebetween. Typically, a draw screen or spacer 110 will be disposed between the support layers of the membrane sheets 104 to help maintain the integrity of the draw channel 108. This is especially true where the draw solution is drawn through the modules 12 under vacuum, while the feed stream is introduced under a positive pressure.

As also shown in FIG. 2, the cassette 18 includes end plates 112 and a manifold arrangement 114 on one end of the cassette 18; however, a second manifold arrangement could also be located on the opposite end of the cassette 18 and/or the manifold arrangement can eliminate the need for an end plate. Generally, the cassette 18 shown in FIG. 2 is an open type of plate and frame configuration and the manifold arrangement 114 provides the inlets 116 and outlets 118 for the draw solution. The feed stream will flow through the open feed channels 106, as the cassette 18 will be at least partially submerged within the tank 13. In an alternative embodiment, for example where the cassette 18 is fully enclosed, additional ports would be provided in the cassette 18 (e.g., via a second manifold arrangement) for introducing and removing the feed stream from the cassette 18/module 12. In the embodiment shown, the cassette 18 is assembled with tie rods 120; however, other mechanical means for securing the plates are contemplated and considered within the scope of the invention.

In some embodiments, one or more of the forward osmosis modules 12 can include electrocoagulation capability to help remove organic materials from the feed. For example, the cassettes 18 can be modified to include electroplates 122. The electroplates 122 can be disposed at the ends of the membrane plate and frame assemblies, for example, between the last membrane and the cassette endplate and/or manifold, as shown in FIG. 2; however, it is possible to locate the electroplates anywhere within the cassette 18 (or system generally) to suit a particular application. Generally, the sacrificial electroplates can be included to introduce, for example, iron (Fe) or aluminum (Al) ions into the first solution as a ligand (i.e., a chelating agent). Also, the electroplates 122 can be added to any one of or all of the forward osmosis modules 12/cassettes 18. In one embodiment, the electroplates 122 are disposed within the first cassette 18a and the ions attract and bind to the long organic chains, thereby removing or at least reducing organics passed to the later stages 12n. Alternatively, the sacrificial plate can be attached to the tank wall or other surface or component whose integrity would not be compromised.

Figure 3:
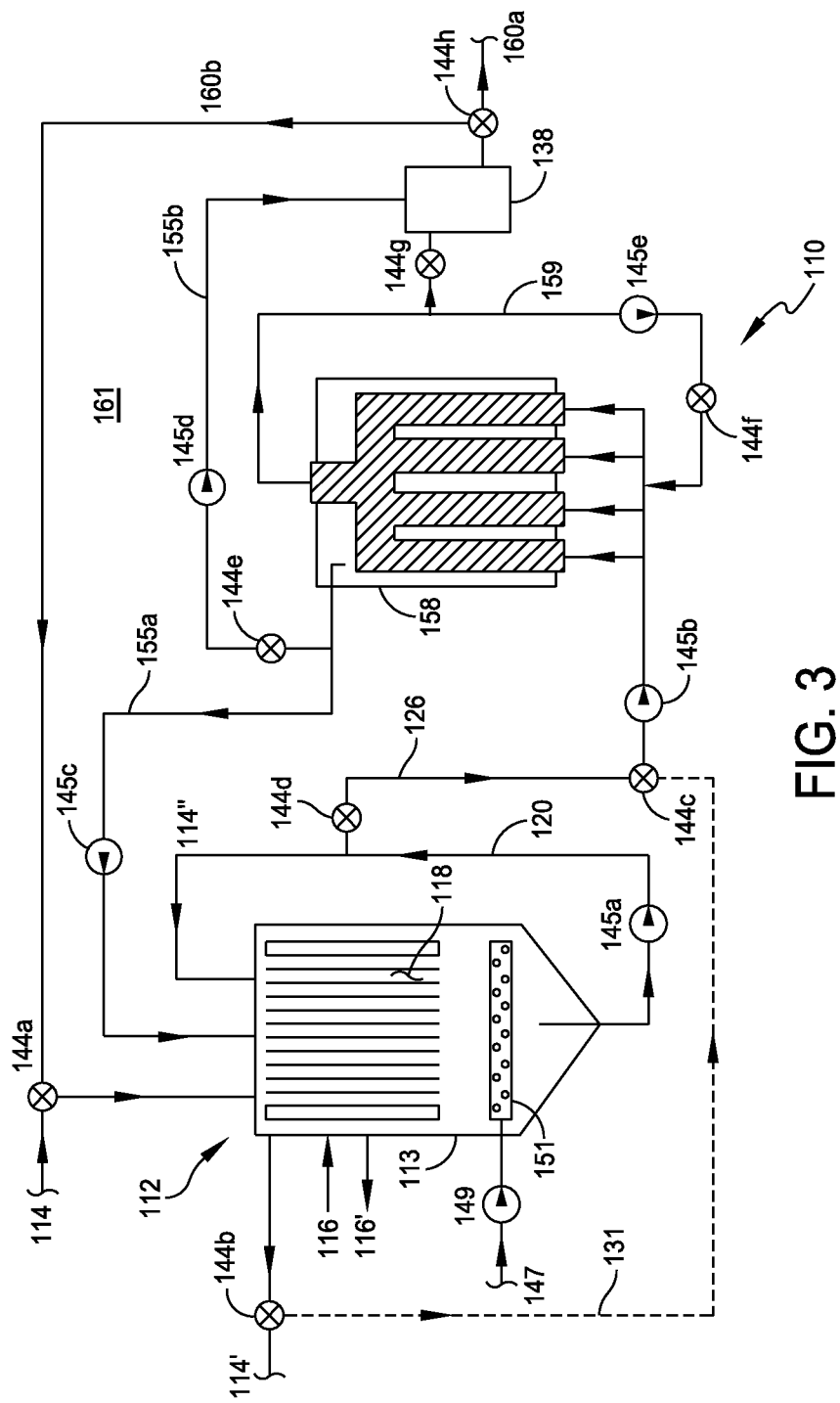
FIG. 3 is a schematic representation of an alternative system for osmotic extraction of a solvent in accordance with one or more embodiments of the invention.

FIG. 3 depicts a system 110 similar to that described with respect to FIG. 1, but with a variation in the brine 160 and solids 159 management, for example, without the use of the hydrocyclone systems. Similar to FIG. 1, the system 110 includes one or more forward osmosis modules 112 that may include one or more feed tanks 113 and membrane cassettes 118 that operate similar to the systems described above. As shown, a feed stream 114 is introduced to one side of the membranes in the FO modules 112, while a concentrated draw solution 116 is introduced to the opposite sides of the membranes, and a concentrated feed stream 114' and a dilute draw solution 116' are output from each FO module 112. In systems 110 having multiple modules 112, the draw solution and feed streams will pass between the individual modules 112 as described above with respect to FIG. 1. After exiting the last module 112, the dilute draw solution 116' will be directed to a separation system as described above (but not shown for clarity). In some embodiments, the concentrated feed 114', or a portion thereof, may be removed from the system 110 after the final module 112n and be directed to a dewatering subsystem 161, as described in greater detail below. However, in certain embodiments, a portion of the inter-stage feed from between modules 112 can be directed to the dewatering subsystem 161, either alone or in combination with any other feed streams 114, 114', 114". In addition to further dewatering the final concentrated feed, the dewatering subsystem 161 can be used to, for example, manipulate the feed stream concentration or remove/reduce TSS between stages, as necessary.

As further shown in FIG. 3, each module 112 can include means for aerating the feed 114 within the tank 113. In a particular embodiment, the aeration means 147 include a perforated tube 151 (or other means for introducing air, specifically bubbles or dissolved air under pressure) disposed proximate the bottom of the tank 113 and in fluid communication with a pump 149 or similar device for introducing air into the feed. Generally, the aeration system 147 is operated as necessary (although it can be run at set intervals/durations and/or accordance with a specific protocol or sensed condition) to create bubbling within the tank 113 that forces scaling or other contamination off of the individual membrane surfaces. Typically, the feed 114 is not pretreated prior to introduction to the module, so it may contain a high level of total suspended solids (TSS), which will have a tendency to collect on the membrane surfaces. Generally, the membranes are able to self-remove gypsum scale formations by a sloughing behavior made possible by the operating conditions at ambient pressures (i.e., in forward osmosis mode, such that the scaling materials are not compacted and dewatered on to the membrane surface). These scale formations, once sloughed off, are broken into smaller particles by the aeration system 147 and forced into suspension (i.e., suspended solids) in the FO tank 113 until they are directed to the dewatering sub-system 161. In some embodiments, the aeration system 147 is operated to hasten the sloughing of the scale, as needed. For example, various sensors in the system 110 may indicate that the scale has formed to a degree where affirmative removal is required (e.g., a drop in flux, increase in draw solution conductivity, etc.), which in turn triggers a change in the operating conditions (e.g., energizing the aeration sub-system, increasing feed stream flow velocity, etc.). The introduction of the air causes a scouring of the membrane surfaces, which causes the solids 159 to slough off of the membrane surfaces and be broken up within the tank 113.

These solids 159 can then be directed to the dewatering sub-system 161, which includes a filter press 158, either directly or as part of the recirculation system 120 (e.g., along with a portion of the recirculated feed 114"). As shown in FIG. 3, the system 110 includes a series of optional pathways for directing the various process streams to different areas of the system 110. For example, the system 110 includes the aforementioned recirculation system 120, which is configured to recirculate the feed stream 114" within the tank 113. The recirculation system 120 includes a pump 145a and one or more valves 144 for directing the flow of the recirculated feed 114". In a particular embodiment, the system 120 includes a by-pass circuit 126 for directing the feed 114" and any solids 159 therein to the filter press 158 via valve 144d and pump 145b. In one or more embodiments, the system 110 includes another by-pass circuit 131 for directing a portion of the concentrated or overflow feed 114' to the filter press 158, for example, via valves 144b, 144c and pump 145b. In various embodiments, all or only a portion of the concentrated feed 114' is directed to the filter press 158, either alone or in combination with the recirculation by-pass stream 126. Typically, the concentrated feed stream 114' is directed to a subsequent FO module in the system or, if at the final FO module, it is sent for further processing (e.g., via the filter press 158) or discarded. Generally, the various valves disclosed herein can be essentially any combination of shut-off and directional valves and will typically be multi-directional valves that can control multiple streams between the various sub-systems, circuits, and modules, as are well-known in the industry. Additionally, the system 110 also includes all of the necessary valves, pumps, sensors, piping, etc. to suit a particular application, including any number and arrangement of valves and lines as necessary to complete any particular circuit or sub-system.

Generally, the filter press 158, along with the necessary valves, pumps, sensors, etc., is part of the overall dewatering subsystem 161 for treating waters with a range of suspended solids derived from a seeded slurry FO process. As shown in FIG. 3, the dewatering sub-system 161 is integrated with a continuous flow, plate & frame membrane desalination system (i.e., FO modules 112 and related sub-systems/circuitry) to increase/enhance water recovery of the FO system by providing a path for the removal of membrane scale formations (e.g., solids 159) and/or extracting additional water from a brine-slurry stream (e.g., concentrated feed 114'). In some embodiments, the concentrated stream 114' includes hydrated minerals that it may be desirable to recover or at least further concentrate. In the case of controlling the TSS in the feed 114", the aforementioned by-pass circuit 126 and aeration system 147 can be used together to remove the scale formations from the membranes and dewater the resulting solids 159. Specifically, the aeration system 147 is operated as described above to cause the scale to detach from the membrane surfaces and be broken up in the tank 113. Then, the solids 159 (i.e., broken-up scale) are directed to the filter press 158 for dewatering, with the additional water 155 directed back to the FO module 112 (e.g., line 155a), directed to an additional process (e.g., line 155b), used as is, or otherwise discarded. The collected solids 159 can be removed as described in greater detail below.

In the case of dewatering the brine/slurry output (feed 114'), the system 110 can be operated without the aeration system 147, with the concentrated slurry being directed to the dewatering sub-system 161 via the by-pass circuit 131 for further dewatering. In some cases, the dewatering sub-system 161 is used in conjunction with continuous flow, fouling resistant membrane systems where there is an opportunity to recover additional water from a liquid-solid suspension of hydrated crystalline minerals, for example gypsum, which is about 21% water by weight. This water can be recovered via the dewatering sub-system 161. The sub-system 161 can be operated continuously, as needed, or according to a predetermined protocol (e.g., at set intervals and durations via triggered sensors and a control system). In some embodiments, the dewatering sub-system 161 can be integrated with the system of FIG. 1.

In the embodiments depicted in FIGS. 3, 4A and 4B, the filter press 158 is a tubular filter press comprising one or more tubes through which the feed streams 114', 114" can be directed. Generally, the walls 165 of the filter tubes are made up of a finely woven fabric, with an appropriate support structure, that allows the water 155 to pass therethrough, but on to which the gypsum (or other solids) will be compacted by the pressure (P) within the tube (see, e.g., FIG. 4B). In one embodiment, the filter tube includes a spiraling rib 163 (FIG. 4A) disposed on its interior surface for establishing an upward vortex/centrifugal effect within the tube to assist with moving the slurry and solids up the tube. As the tube diameter is reduced by the solids formations, the pressure increases, eventually forcing the solids 159 off of the fabric and through the tubes.

As shown in FIG. 3, all or a portion of the solids 159 can be recirculated through the filter press 158 via a pump 145e and one or more valves 144f. Additionally or alternatively, all or a portion of the solids 159 can be directed (e.g., via valve(s) 144g) to an additional process 138 or means for further processing to, for example, recover seed material, settle the solids, or recycle the solids back to the main feed stream 114. In some cases, a portion of the recovered water 155b can be directed to (e.g., via a pump 145d and valve(s) 144e) and combined with the recovered solids to assist in any further processing. In various embodiments, the solids 159 can be allowed to settle out or thicken within a clearwell (e.g., 32 in FIG. 1) while the brine 160a, less the solids, can be removed from the system 110 and sent for further processing or otherwise discarded. In some embodiments, a portion of the brine 160b can be recycled back to the feed stream 114, for example via valves 144h, 144a and any necessary pumping equipment.

In accordance with one or more embodiments, the devices, systems and methods described herein may generally include a controller for adjusting or regulating at least one operating parameter of the device or a component of the systems, such as, but not limited to, actuating valves and pumps, as well as adjusting a property or characteristic of one or more fluid flow streams through an osmotically driven membrane module, or other module in a particular system. A controller may be in electronic communication with at least one sensor configured to detect at least one operational parameter of the system, such as a concentration, flow rate, pH level, or temperature. The controller may be generally configured to generate a control signal to adjust one or more operational parameters in response to a signal generated by a sensor. For example, the controller can be configured to receive a representation of a condition, property, or state of any stream, component, or subsystem of the osmotically driven membrane systems and associated pre- and post-treatment systems. The controller typically includes an algorithm that facilitates generation of at least one output signal that is typically based on one or more of any of the representation and a target or desired value, such as a set point. In accordance with one or more particular aspects, the controller can be configured to receive a representation of any measured property of any stream, and generate a control, drive or output signal to any of the system components, to reduce any deviation of the measured property from a target value.

In accordance with one or more embodiments, process control systems and methods may monitor various concentration levels, such as may be based on detected parameters including pH and conductivity. Process stream flow rates and tank levels may also be controlled. Temperature, pressure, and other operational parameters and maintenance issues may be monitored. Various process efficiencies may be monitored, such as by measuring product water flow rate and quality, heat flow and electrical energy consumption. Cleaning protocols for biological fouling mitigation may be controlled such as by measuring flux decline as determined by flow rates of feed and draw solutions at specific points in a membrane system. A sensor on a brine stream may indicate when treatment is needed, such as with distillation, ion exchange, breakpoint chlorination or like protocols. This may be done with pH, ion selective probes, Fourier Transform Infrared Spectrometry (FTIR), or other means of sensing draw solute concentrations. A draw solution condition may be monitored and tracked for makeup addition and/or replacement of solutes. Likewise, product water quality may be monitored by conventional means or with a probe such as an ammonium or ammonia probe. FTIR may be implemented to detect species present providing information which may be useful to, for example, ensure proper plant operation, and for identifying behavior such as membrane ion exchange effects.

Those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is, therefore, to be understood that the embodiments described herein are presented by way of example only and that, within the scope of the appended claims and equivalents thereto; the invention may be practiced otherwise than as specifically described.

Moreover, it should also be appreciated that the invention is directed to each feature, system, subsystem, or technique described herein and any combination of two or more features, systems, subsystems, or techniques described herein and any combination of two or more features, systems, subsystems, and/or methods, if such features, systems, subsystems, and techniques are not mutually inconsistent, is considered to be within the scope of the invention as embodied in the claims. Further, acts, elements, and features discussed only in connection with one embodiment are not intended to be excluded from a similar role in other embodiments.

What is claimed is:

1. A system for osmotic extraction of a solvent from a first solution, the system comprising:
   a plurality of forward osmosis units, each comprising:
      a semi-permeable membrane assembly comprising a framework and a plurality of membranes coupled thereto and having first sides and second sides, where the first sides define a first plurality of channels for receiving the first solution and the second sides define a second plurality of channels for receiving a concentrated draw solution, wherein the membranes are configured for osmotically separating the solvent from the first solution, thereby forming a more concentrated first solution in the first plurality of channels and a dilute draw solution in the second plurality of channels; and
      a tank configured for receiving the semi-permeable membrane assembly and the first solution, wherein the semi-permeable membrane assembly is at least partially submerged within the tank;
   a separation system in fluid communication with the plurality of forward osmosis units and configured for receiving the dilute draw solution from the forward osmosis units, the separation system comprising means for separating the dilute draw solution into the concentrated draw solution and a solvent stream;
   a plurality of recirculation systems, each in fluid communication with a corresponding forward osmosis unit and configured for recirculating the more concentrated first solution through each tank; and
   a plurality of hydrocyclone circuits, each in fluid communication with a corresponding recirculation system and configured to control a concentration of solids within the first solution within each tank.

2. The system of claim 1, wherein the framework comprises a plurality of plates, each plate having first and second sides configured for receiving the membranes and at least partially defining the first and second pluralities of channels, at least one endplate disposed at one end of the plurality of plates and membranes and a manifold assembly disposed at an opposite end of the plurality of plates and membranes, and means for securing the plurality of plates, the at least one end plate, and the manifold assembly in a stacked configuration.

3. The system of claim 1 further comprising a clearwell stage in fluid communication with the plurality of forward osmosis units and configured for receiving the more concentrated first solution.

4. The system of claim 3, wherein the plurality of forward osmosis units are arranged in series and the clearwell stage is disposed proximate and in fluid communication with a last forward osmosis unit in the series.

5. The system of claim 4, wherein each hydrocyclone circuit comprises a hydrocyclone sized and configured to forward an overflow of the first solution to a subsequent forward osmosis unit in the series of forward osmosis units and the final hydrocyclone circuit is in fluid communication with the clearwell stage and configured to control the volume of the first solution in each of the preceding forward osmosis units.

6. The system of claim 3, wherein the clearwell stage further comprises means for dewatering the more concentrated first solution.

7. The system of claim 6, wherein the means for dewatering the more concentrated first solution comprises a filter press.

8. The system of claim 1, wherein the means for separating the dilute draw solution of the separation system comprises:
   a filtration unit;
   a reverse osmosis unit; and
   a by-pass circuit all in fluid communication with the plurality of forward osmosis units.

9. The system of claim 1 further comprising:
   at least one dewatering sub-system in fluid communication with at least one of the recirculation systems or at least one of the tanks and configured to control a concentration of solids within the first solution within each tank.

10. The system of claim 1 further comprising an aeration system for introducing air in to the tanks.

* * * * *